March 2, 1948. W. M. KELLER 2,437,162
TABLE FOR VEHICLES
Filed March 9, 1946 2 Sheets-Sheet 2
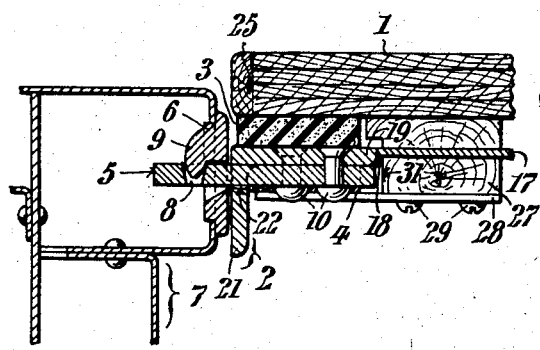
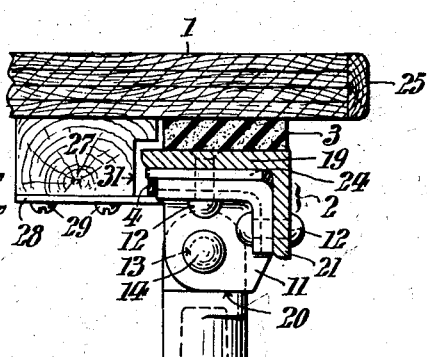
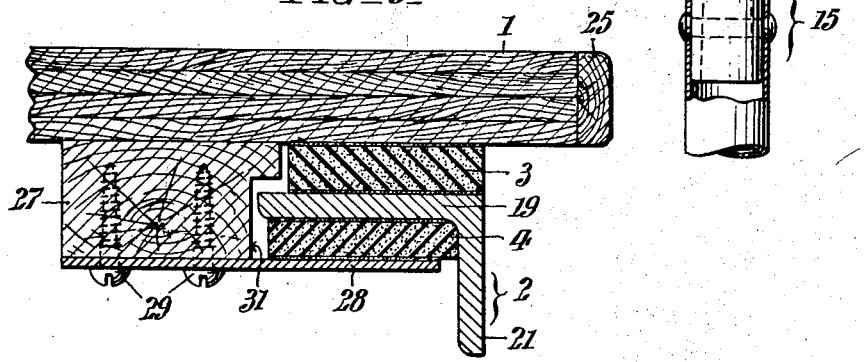
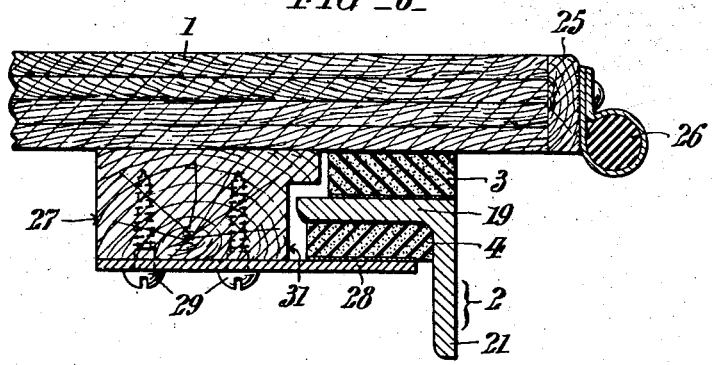
WITNESSES
INVENTOR:
William M. Keller,
BY
ATTORNEYS.

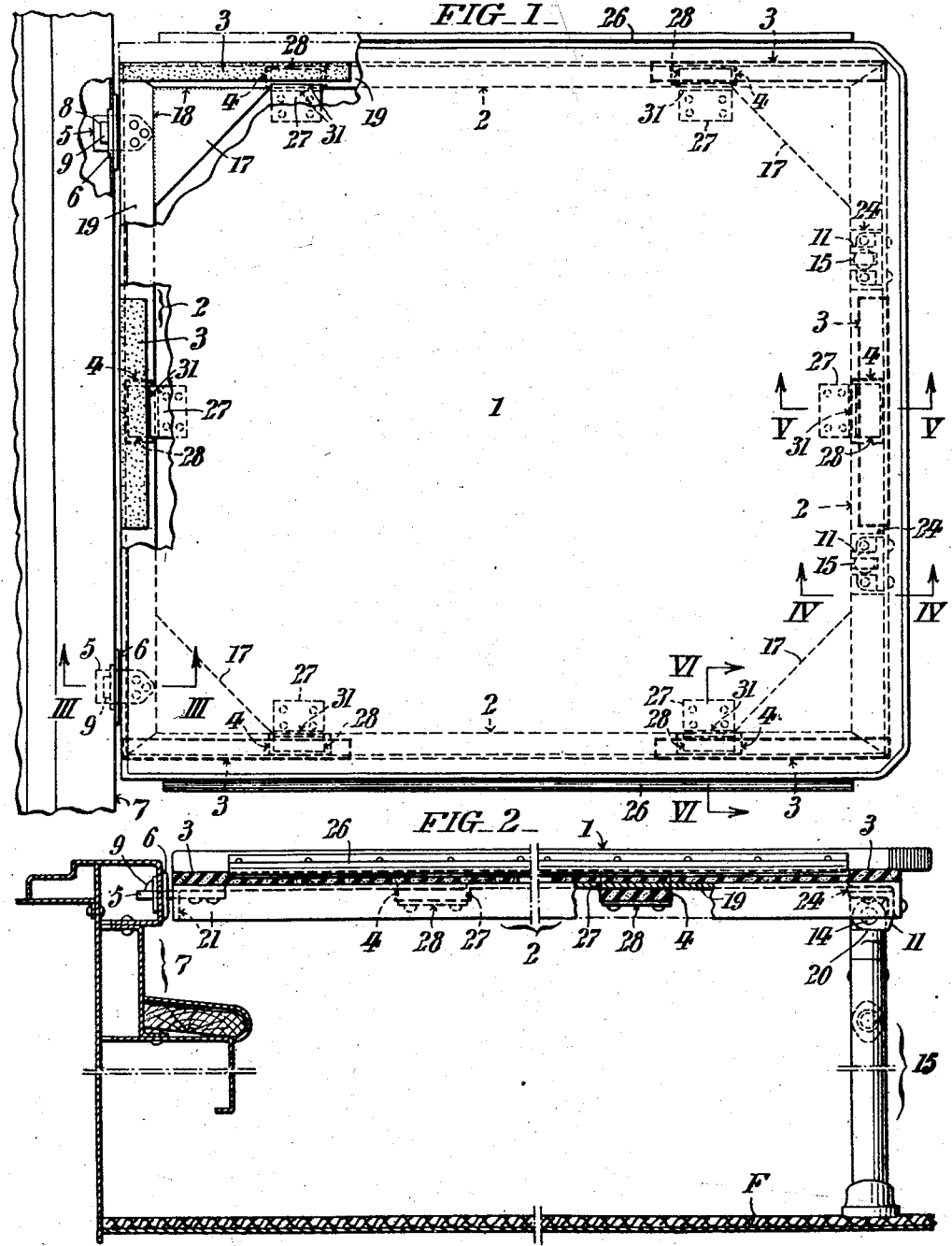

UNITED STATES PATENT OFFICE 2,437,162

TABLE FOR VEHICLES

William M. Keller, Merion, Pa., assignor to The Pennsylvania Railroad Company, Philadelphia, Pa., a corporation of Pennsylvania Application March 9, 1946, Serial No. 653,246

2 Claims. (Cl. 311—18)

This invention relates to a table for vehicles and is especially useful as applied to a portable table for use in railway cars, particularly dining cars, though it has obvious application to any vehicle or the like which is subject to vibration or shock.

The object of the invention is to provide for use in such a vehicle a table having a top surface which is substantially isolated from the vehicle or the compartment thereof within which the table is located, and which is so cushioned as to minimize the transmission of vibration from the floor and walls of the vehicle or compartment to the utensils or other objects which may rest upon the table. It is well known, for example, that in the customary railway dining car the tables are so attached to the side walls and supported upon the floor that the vibrations of the car are imparted to the objects on the tables with resulting annoyance and inconvenience to the waiters and passengers.

A further object of the invention is to provide a table of this character so designed that it is interchangeable with the conventional form of table now used in railway cars and is relatively simple and inexpensive to manufacture.

Other more specific objects and advantages of the invention will become more apparent from the detailed description of one embodiment thereof, designed for use in a railway dining car, which follows hereinafter having reference to the accompanying drawings. Of the drawings:

Fig. 1 represents a table embodying my invention and applied to the side wall of a dining car with a portion of the table cut away to illustrate details of construction;

Fig. 2 represents an enlarged side elevation of portions of the table and car wall with a part of the table frame cut away to illustrate details of construction; and Figs. 3, 4, 5 and 6 represent vertical cross sections of the same taken as indicated by the arrows III—III, IV—IV, V—V, and VI—VI respectively in Fig. 1.

With reference to the drawings, the illustrated form of the invention comprises a table top 1 and a rigid frame 2 with cushioning elements 3, 4 of sponge rubber or like material interposed between and secured to the table top 1 and frame 2.

In a manner similar to the conventional dining car table the frame 2 is provided at the side which is adjacent to the side wall 7 of the car with a pair of outwardly projecting brackets 5, adapted for insertion in sockets 6 in the side wall 7. As most clearly shown in Figs. 1 and 3, the brackets 5 have slots 8 which are adapted to be engaged by downwardly projecting lugs 9 in the wall sockets 6 to secure the table to the wall 7 while permitting it to be readily detached when not in use. The brackets 5 are secured to the frame 2 by means of rivets 10. At the opposite side of the table, adjacent to the center aisle of the car, the frame 2, as shown in Figs. 2 and 4, has a pair of hinge fittings 11 secured thereto by rivets 12, each fitting having an aperture 13 for reception of a hinge pin 14 by means of which the table legs 15, which are of conventional form and construction, are hinged to the frame 2. When not used to give elevated support to the inner end of the table ubon the car floor F the legs 15 may be swung upwardly toward the underside of the frame 2 to collapse the table in the customary manner. The legs 15 are prevented from swinging in the opposite direction by virtue of their engagement with the horizontal edges 20 of the hinge fittings 11.

The frame 2 is desirably skeletonized and consists of four angle bars joined and reinforced by triangular gussets 17, there being a gusset at each corner, and the gussets being welded, as indicated at 18, to the edges of the inturned horizontal flanges 19 of the frame 2. At the side of the table adjacent to the wall the downturned flange 21 of the frame 2 is slotted at 22 to accommodate the brackets 5 which pass through the frame and are riveted to the underside of its horizontal flange 19. At the opposite side of the table, and at the locations where the hinge fittings 11 are applied, a filler 24 is disposed between the hinge fittings 11 and the horizontal flange 19 of the frame 2 to give the proper spacing to level the frame when legs 15 of standard length are hinged to the fittings 11.

As shown in Fig. 1 and Figs. 3 to 6, the table top 1 is in the illustrated example of the invention made of plywood and has a hardwood border 25 to which rubber bumpers 26 are attached at the two sides which run transversely of the car. Attached to the underside of the table top 1 are filler pieces 27, there being two such pieces at each side which is transverse to the car and one at each of the other two sides of the table disposed at the center thereof. Each filler piece 27 has a plate 28, secured thereto by screws 29, forming a bracket which extends horizontally and outwardly beyond the edges of the filler piece in sich manner that a channel is defined, as clearly seen in Figs. 5 and 6, by the underside of the table top 1, the filler piece 27 and the plate 28 for receiving the cushion comprising the sponge rubber elements 3 and 4. Furthermore, the filler piece 27 is so disposed inwardly from the edge of the table top 1 and cut-away, as indicated at 31, that it is spaced from and at all times out of contact with the horizontal flange 19 of the frame 2.

Desirably the upper cushioning elements 3 which carry the weight of the table top 1 are in the form or relatively long strips cemented to the underside of the table top 1 and to the top of the horizontal flange 19 of the frame 2 whereas the lower cushioning elements 4 are in the form of relatively short strips cemented to the underside of the horizontal flange 19 and to the top of the plates 28. The horizontal flange 19 of the frame 2 is thus embedded within a cushion formed by the sponge rubber elements 3 and 4, and while firmly secured to the cushion it does not have any point of contact with the table top 1 or the rigid attachments suspended beneath the same. It will further be observed that the table top 1 overhangs the frame 2 at all of the sides except the side which is adjacent to the wall 7 of the car so that persons using the table do not ordinarily have any contact with the frame.

The special method of attaching the cushioning strips 3 and 4 within the channels formed at each of the four sides of the table and of inserting the horizontal flange 19 of the frame 2 between the upper and lower cushioning strips 3, 4 isolates the table top 1 from the frame 2 so that in effect it floats upon the cushioning elements. Sufficient surface areas are provided for securely cementing the cushioning elements 3 and 4 to the table top 1 and frame 2, but the volume and weight of all materials entering into the construction of the table is reduced to a minimum consistent with strength and utility.

While I have described one form of my invention as applied to a dining car table and have specified the materials and particular characteristics of the various parts of a table constructed according to this preferred form of the invention, it will be understood that numerous modifications may be made suiting the tastes of the designer of such a table or the particular use to which the table may be put, all without departing from the spirit of the invention as defined in the annexed claims.

Having thus fully described my invention, I claim:

1. A table for vehicles comprising a skeleton rectangular frame composed of angle bars having inwardly projecting flanges, and having means at one side for attachment to a wall of the vehicle, and means at the opposite side for supporting the frame in elevated position above the floor of the vehicle, a table top resiliently mounted within the open area defined by said angle bars and having brackets suspended from the table top and forming with the bottom surface thereof channels opening outwardly to accommodate said inwardly projecting flanges of the frame, and cushioning elements of sponge rubber or like material interposed between and secured to the flanges of the frame, the table top and the brackets therebeneath, said frame being otherwise wholly isolated from the table top.

2. The table defined in claim 1 wherein the cushioning elements consist of relatively long strips secured to the underside of the table top and the flanges within said channels and relatively short strips secured to the brackets and the flanges within said channels.

WILLIAM M. KELLER.

REFERENCES CITED

The following references are of record in the file of this patent:

UNITED STATES PATENTS

| Number | Name | Date |
|---|---|---|
| 440,969 | Smith | Nov. 18, 1890 |
| 597,537 | Campbell | Jan. 18, 1898 |
| 830,187 | Spencer | Sept. 4, 1906 |
| 1,697,094 | Tork | Jan. 1, 1921 |
| 1,732,520 | Leatherman | Oct. 22, 1929 |
| 1,788,878 | Lee | Sept. 16, 1927 |
| 1,975,909 | Trott | Oct. 9, 1934 |
| 2,031,287 | Swanson | Feb. 18, 1936 |
| 2,188,897 | Hall | Feb. 6, 1940 |
| 2,328,614 | Busse | Sept. 7, 1943 |
| 2,404,403 | Poylo | Feb. 13, 1943 |